United States Patent [19]

Rozman et al.

[11] Patent Number: 4,967,132
[45] Date of Patent: Oct. 30, 1990

[54] VSCF START SYSTEM CURRENT ESTIMATOR

[75] Inventors: Gregory I. Rozman; Vijay K. Maddali, both of Rockford, Ill.

[73] Assignee: Sundstrand Corporation, Rockford, Ill.

[21] Appl. No.: 279,972

[22] Filed: Dec. 5, 1988

[51] Int. Cl.$^5$ ............................................. H02P 5/40
[52] U.S. Cl. .................................... 318/798; 318/806; 318/723
[58] Field of Search ................................ 318/721–723, 318/254, 138, 798, 806; 290/52, 40 R

[56] References Cited

U.S. PATENT DOCUMENTS

| | | |
|---|---|---|
| 4,276,505 | 6/1981 | Bose ..................................... 318/723 |
| 4,450,398 | 5/1984 | Bose ..................................... 318/806 |
| 4,525,660 | 6/1985 | Katto . |
| 4,689,543 | 8/1987 | Hucker . |
| 4,707,618 | 11/1987 | Haas . |
| 4,818,890 | 4/1989 | Mose et al. ........................... 290/52 |

Primary Examiner—David Smith, Jr.
Attorney, Agent, or Firm—Wood, Phillips, Mason, Recktenwald & VanSanten

[57] ABSTRACT

The problem of excess size and weight resulting from the use of current sensors in a VSCF start system is solved by a motor control system which utilizes a current estimator to develop a current feedback value. The current estimator is coupled to a rotor position detector and an input power detector to develop a signal representing the estimated current drawn by the motor.

10 Claims, 4 Drawing Sheets

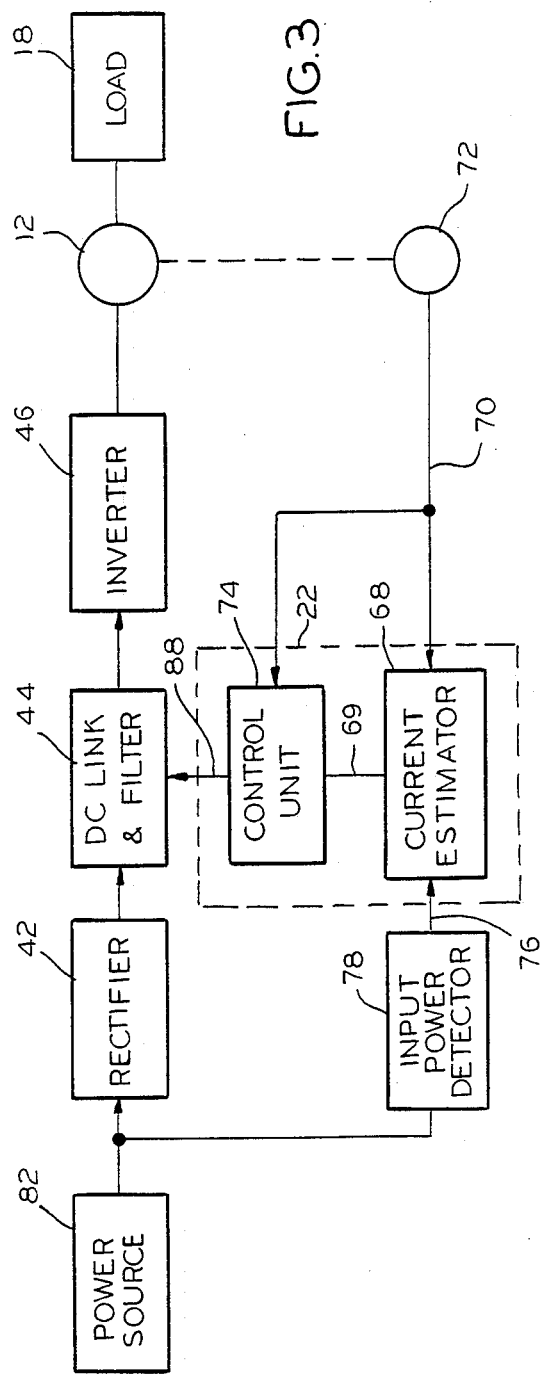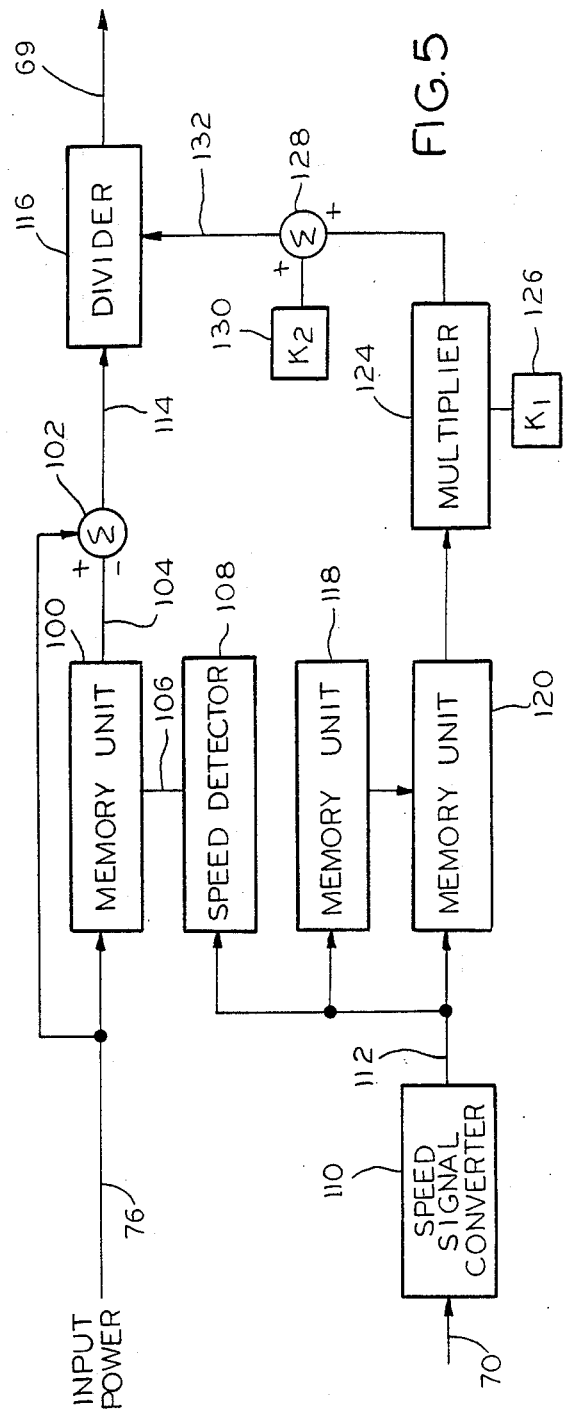

VSCF START SYSTEM CURRENT ESTIMATOR

FIELD OF THE INVENTION

This invention relates to electrical power systems and more particularly to a dual mode control system therefor including a generate mode of operation and a start mode of operation.

BACKGROUND OF THE INVENTION

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil. Owing to the variation in engine speed, the frequency of the power developed in the generator windings is similarly variable This variable frequency power is converted to constant frequency power in a variable speed constant frequency (VSCF) system including a power converter which may develop, for example, 115/200 $V_{AC}$ power at 400 Hz. Such known converters are controlled by a generator/converter control unit (GCCU).

In order to provide aircraft engine starting, such known power systems have operated the generator as a motor. Specifically, an external power source is coupled through a start control to the generator to energize the stator coil and thus develop motive power to start the engine. The components required in such a start control increase the weight of the aircraft and take up valuable space. To minimize the size and weight of such start controls, certain known aircraft VSCF power systems have utilized the existing converter and GCCU for the start control.

In the start mode of operation, the converter may be supplied power from any 400 Hz power source, such as, for example, an auxiliary power unit generator or an external power source. However, each such power source might have a different available capacity for use in engine starting. Therefore, the GCCU must be configured to provide engine starting from any such available power sources and to limit the amount of power drawn.

Rozman et al. co-pending application entitled VSCF Start System with Selectable Input Power Limiting, Ser. No. 220,625, filed Nov. 14, 1988, and owned by the assignee of the present invention, which is hereby incorporated by reference herein, discloses a start control which provides input power limitations in accordance with input power requirements. Specifically, the start control described therein utilizes a pulse width modulated inverter to control torque and power as functions of the output voltage and commutation angle. Specifically, the start control maintains the volts/hertz ratio at a constant and uses closed loop control of the commutation angle at speeds above a preselected minimum to control current and to limit input power.

In order to control stator current it is necessary to provide feedback information representing actual current. This information is commonly obtained using a current sensing device to measure the actual current. Known measuring systems employ a shunt resistor, a current transformer or a hall sensor. Shunt resistors are practical only for low power motor control due to the additional power losses and weight. Current transformers are typically used to measure larger current levels at medium and high speeds. At low speeds, current transformers are less accurate. To overcome such inaccuracies, the size and weight thereof must be increased. Hall sensors are typically used to measure current at low speed. However, such sensors tend to be sensitive to the temperature range and they are of relatively large size.

Another problem resulting from the use of current sensors is the necessity of filtering the signals produced thereby. At low rotational speeds, a conventional scheme which uses amplitude detection requires a filter with a large time constant which limits the dynamic performance of the motor control system.

The present invention is intended to overcome one or more of the problems as set forth above.

SUMMARY OF THE INVENTION

In accordance with the present invention, a motor control system provides an estimate of motor current to permit weight and size reduction of a typical motor control system.

Broadly, there is disclosed herein a current estimator for a motor having a rotor and stator having a stator coil which is energized from a source of power for imparting rotation to the rotor. The estimator includes means for sensing the speed of rotational movement of the rotor and means for sensing the power drawn by the stator coil from the source of power. Means are coupled to the sensing means for developing a signal representing an estimation of the current through the stator coil responsive to the speed of the rotor and the power drawn by the stator coil.

Specifically, the current estimator is coupled to a rotor position detector and an input power detector. The current estimator develops a signal representing the estimated current drawn by the motor. The stator coil current has been found to be equal to:

$$I_{AC} = (P_{in} - P_{loss})/((K_1 \cdot \omega) + K_2)$$

where:
 $I_{AC}$-stator current (AC motor phase current);
 $P_{in}$-power supplied by the power source;
 $P_{loss}$-losses in the start control circuit;
 $K_1$ and $K_2$-constants; and
 $\omega$-motor speed.

The current estimator includes a circuit designed to calculate the motor current in accordance with the above equation. Specifically, the power delivered by the power source is sensed by an input power detector which is coupled to a memory unit and to a summing junction. When the speed of the motor is at or near zero, the memory unit stores the output of the power detector. This signal represents the parameter $P_{loss}$ and is subtracted from a subsequent power measurement $P_{in}$ to obtain the quantity $P_{in} - P_{loss}$. This quantity is passed to an input of a divider.

The signal developed by the rotor position detector is converted into a speed signal by a speed converter and is applied to a speed detector and a memory unit. When the motor speed is above a certain speed, the output of the converter is stored. The stored value is subsequently applied to a multiplier and a summing junction to obtain the value $K_1 \cdot \omega + K_2$. This value is applied to the second input of the divider which in turn develops the estimated motor current signal $I_{AC}$.

According to the invention, in applications where it is desired to maintain a ratio of voltage to speed at a constant, the constant $K_1$ represents the desired ratio, and the constant $K_2$ represents a boost voltage required to offset the IR drop of the machine at low speeds.

According to another aspect of the invention, the current estimator forms part of a control for a motor which is controllably energized from the power source to control the motor.

According to still another aspect of the invention, the motor comprises a brushless DC motor which is energized from a source of DC power through a converter which includes an inverter circuit. The inverter circuit includes switches which are controllably energized and alternately apply positive and negative DC voltage to the stator coil for controlling motor operation.

In accordance with the above, it is an object of the present invention to provide a motor current estimation in a motor control system employing motor position detection and input power detection to permit weight and size reduction of a typical VSCF start system.

It is another object of the present invention to detect the RMS magnitude of the motor current at low speeds without introducing a significant time delay.

Further features and advantages of the invention will readily be apparent from the specification and from the drawings.

BRIEF DESCRIPTION OF THE DRAWINGS

FIG. 3 is a block diagram of the control system specifically illustrating the start mode of operation;

FIG. 5 is a more detailed block diagram of the current estimator of the generator/converter control unit of FIG. 3.

DESCRIPTION OF THE INVENTION

Figure 1:
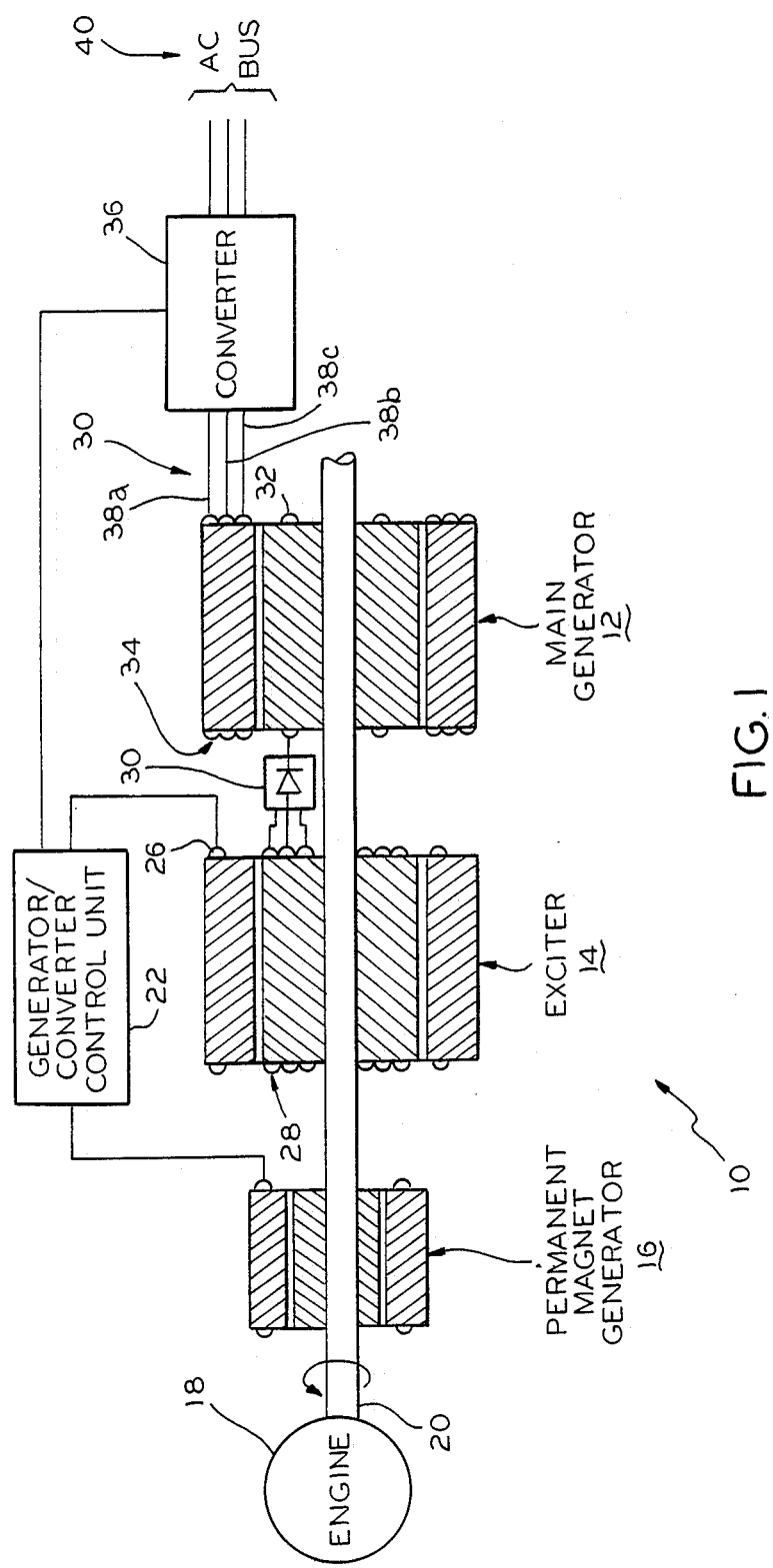
FIG. 1 is a combined diagrammatic illustration-block diagram of an electrical system incorporating the start system of the present invention.

Referring first to FIG. 1, an electrical power system 10 includes a main generator 12, an AC exciter 14 for providing main field current to the generator 12 and a permanent magnet generator (PMG) 16. Each of the main generator 12, exciter 14 and PMG 16 are driven by an engine 18 through a common shaft 20.

A generator/converter control unit (GCCU) 22 receives the power developed by the PMG and delivers a controlled current to a field winding 26 of the exciter 14. As is conventional in brushless power systems, rotation of the shaft 20 by the engine 18 results in generation of a polyphase voltage in armature windings 28 of the exciter 14. This polyphase voltage is rectified by a rectifier bridge, illustrated generally at 30, and the rectified power is coupled to a field winding 32 of the main generator 12. The current in the field winding 32 and the rotation of the shaft 20 sets up a rotating magnetic field in space occupied by a set of main generator stator windings, or stator coil, 34. The stator windings 34 develop polyphase output power which is delivered to a converter 36 over a bus 38 comprising at least three conductors 38a, 38b, and 38c.

In a typical application, the engine 18 is the main engine in an aircraft, and the converter 36 is part of a variable speed constant frequency (VSCF) system for delivering constant frequency power to an AC bus 40 for powering aircraft loads (not shown), as controlled by the GCCU 22.

During engine start, the engine 18 is started using the main generator 12 operating as a motor. Particularly, the main generator 12 receives power from the converter 36 which is controlled by the GCCU 22. For ease of explanation herein, the main generator 12 is referred to as a motor when operated as such in the start mode of operation.

Figure 2:
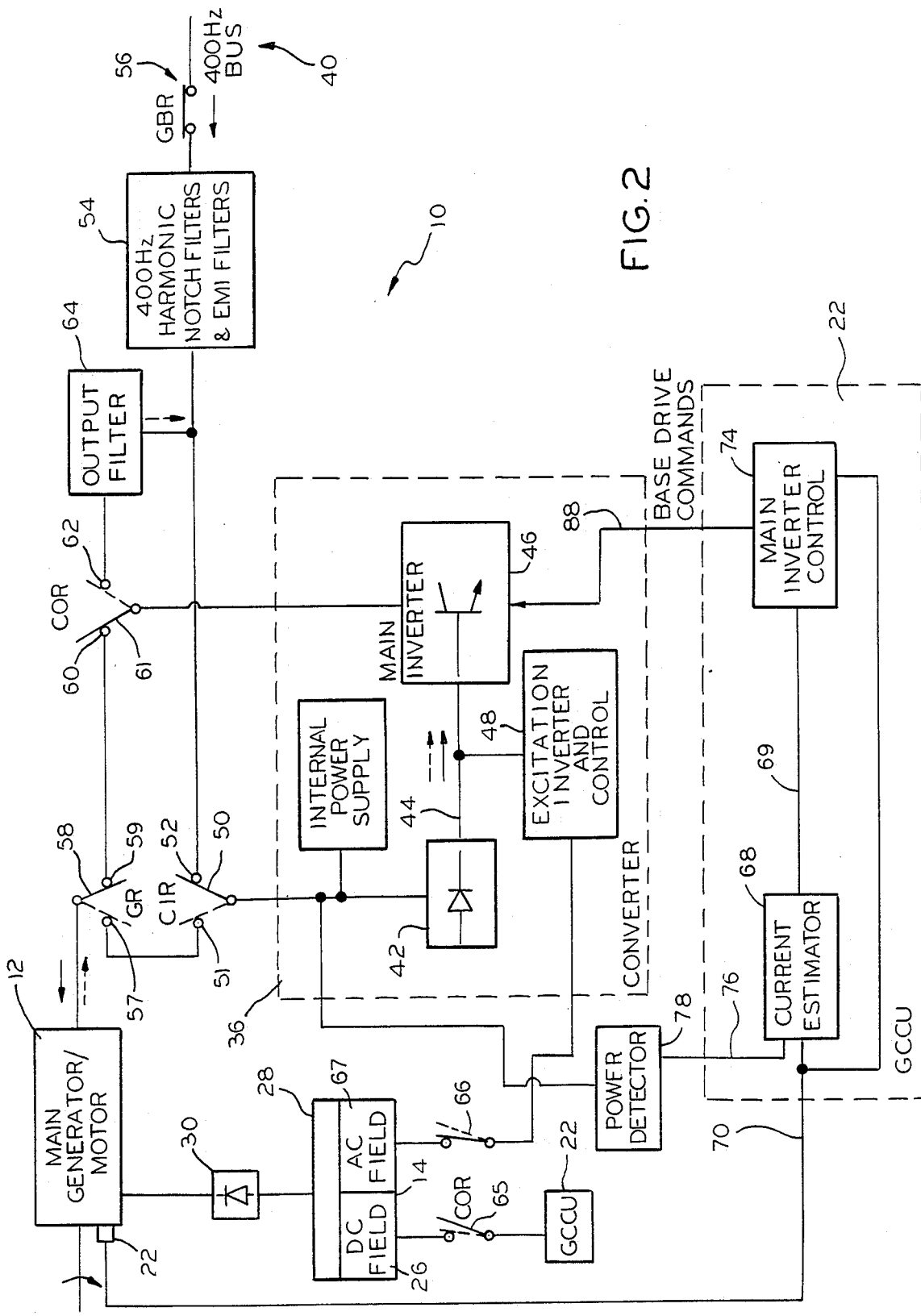
FIG. 2 is a generalized block diagram of the electrical power system including a control system for the generate mode of operation and the start mode of operation.

Referring now to FIG. 2, the electrical power system 10 is illustrated in greater detail in block diagram form.

The converter 36 includes an AC/DC converter 42 connected by a DC link 44 to a DC/AC converter 46. Particularly, according to the illustrative embodiment of the invention, the AC/DC converter 42 comprises a full wave bridge rectifier circuit of conventional construction which is operable to convert three phase AC power to DC power, the DC link 44 includes a conventional filter, and the DC/AC converter 46 comprises a main inverter circuit, described more specifically below relative to FIG. 4. The converter 36 also includes an excitation inverter and control 48 connected to the DC link 44 for developing AC power on a line 49 for the motor field during the start mode of operation.

The AC side of the rectifier 42 is connected to a movable contact 50 of a converter input relay (CIR). The relay CIR also includes respective first and second fixed contacts 51 and 52. The second fixed contact 52 is connected through a filter circuit 54 and generator bus relay (GBR) 56 to the AC bus 40. The first fixed contact 51 is connected to a first fixed contact 57 of a generator relay (GR). The GR relay also includes a movable contact 58 and a second fixed contact 59. The movable contact 58 is connected to the main generator 12, i.e., to the windings 34 shown in FIG. 1. The second fixed contact 59 is connected to a first fixed contact 60 of a converter output relay (COR). The COR relay also includes a movable contact 61 and a second fixed contact 62. The movable contact 61 is connected to the output of the main inverter 46. The second fixed contact 62 is connected through an output filter 64 to the filter circuit 54. The COR relay also includes respective first and second field control switches 65 and 66. The first switch 65 connects the exciter field winding 26 to the GCCU 22. The second switch 66 connects the excitation inverter and control 48 to an AC start field winding 67 of the exciter 14. Specifically, the excitation for the wound field main generator/motor 12 cannot be supplied at zero speed by the exciter 14. Accordingly, the excitation inverter and control 48 and the start field winding 67 are included functioning as a rotary transformer. Specifically, AC power delivered on the line 49 to the exciter AC field winding 67 develops corresponding AC power in the armature windings 28 for powering the motor field winding 32.

During engine start, the relays GR, CIR and COR are operated as shown in solid line in FIG. 2. Conversely, in the generate mode, these relays GR, CIR and COR are operated as shown in dashed line in FIG. 2.

Although the relays GR, CIR and COR are shown as providing a single line connection, each of the relays is provided with suitable switches to switch three phase power, as is well known.

The GCCU 22 includes a current estimator 68 which receives a rotor position signal on a line 70 from a rotor position sensor 72 associated with the main generator 12. The position sensor 72 may be, for example, a conventional resolver. The current estimator 68 also receives an input power signal on a line 76 from a power detector 78. The power detector 78 may be of any conventional form and is operable to sense the input power delivered to the converter 36 when operating in the start mode of operation. The current estimator 68 develops a signal on a line 69 which represents an estimation of the current in the stator windings 34. The rotor position signal on the line 70 and the current signal on the line 69 are transferred to a main inverter control 74. The main inverter control 74 develops base drive commands on a line 88 for controlling the inverter 46.

In the generate mode of operation, with the relay contacts GR, CIR and COR as illustrated in dashed lines, three phase power developed by the main generator 12 is delivered through the GR relay movable contact 58, its first fixed contact 57, through the CIR relay first fixed contact 51 and its movable contact 50 to the rectifier 42. The rectifier 42 converts the three phase AC power to DC power which is transferred over the DC link 44 to the inverter 46 which converts the power to AC power of constant frequency. The constant frequency AC power from the inverter 46 is delivered through the CIR relay movable contact 61 to the second fixed contact 62, through the output filter 64, and the filter 54 to the AC bus 40. Field power is developed by the AC exciter 14 utilizing the DC field winding 26 powered from the GCCU 22 through the first field control switch 65.

In the start mode of operation, the relays GR, CIR and COR are controlled so that their contacts are positioned as shown by the solid lines. Particularly, the AC bus 40 is connected to any available power source. The AC power is delivered through the filter 54, to the second fixed contact 52 and movable contact 50 of the CIR relay to the rectifier 42. The AC voltage is then rectified and transferred through the DC link 44 to the main inverter 46 where it is converted to AC power. The AC power from the main inverter 46 is delivered through the movable contact 61 and the first fixed contact 60 of the COR relay, and subsequently through the second fixed contact 59 and movable contact 58 of the GR relay to the armature windings of the main generator/motor 12. Field power to the main generator 12 is provided from the excitation inverter and control 48 through the second COR field control switch 66 to the exciter AC field winding 67, as discussed above.

Referring now to FIG. 3, a block diagram representation more specifically illustrates the operation of the electrical power system 10 according to the invention in the start mode of operation, as discussed immediately above. A power source 82 is coupled to the rectifier 42 which is coupled through the DC link and filter 44 to the main inverter 46. The GCCU 22 receives the input power feedback signal on the line 76 from the power detector circuit 78 which senses power delivered from the power source 82. The GCCU 22 also receive the position signal on the line 70 from the rotor position sensor 72. As discussed above, the GCCU 22 develops the base drive commands for the main inverter 46 on the line 88.

Figure 4:
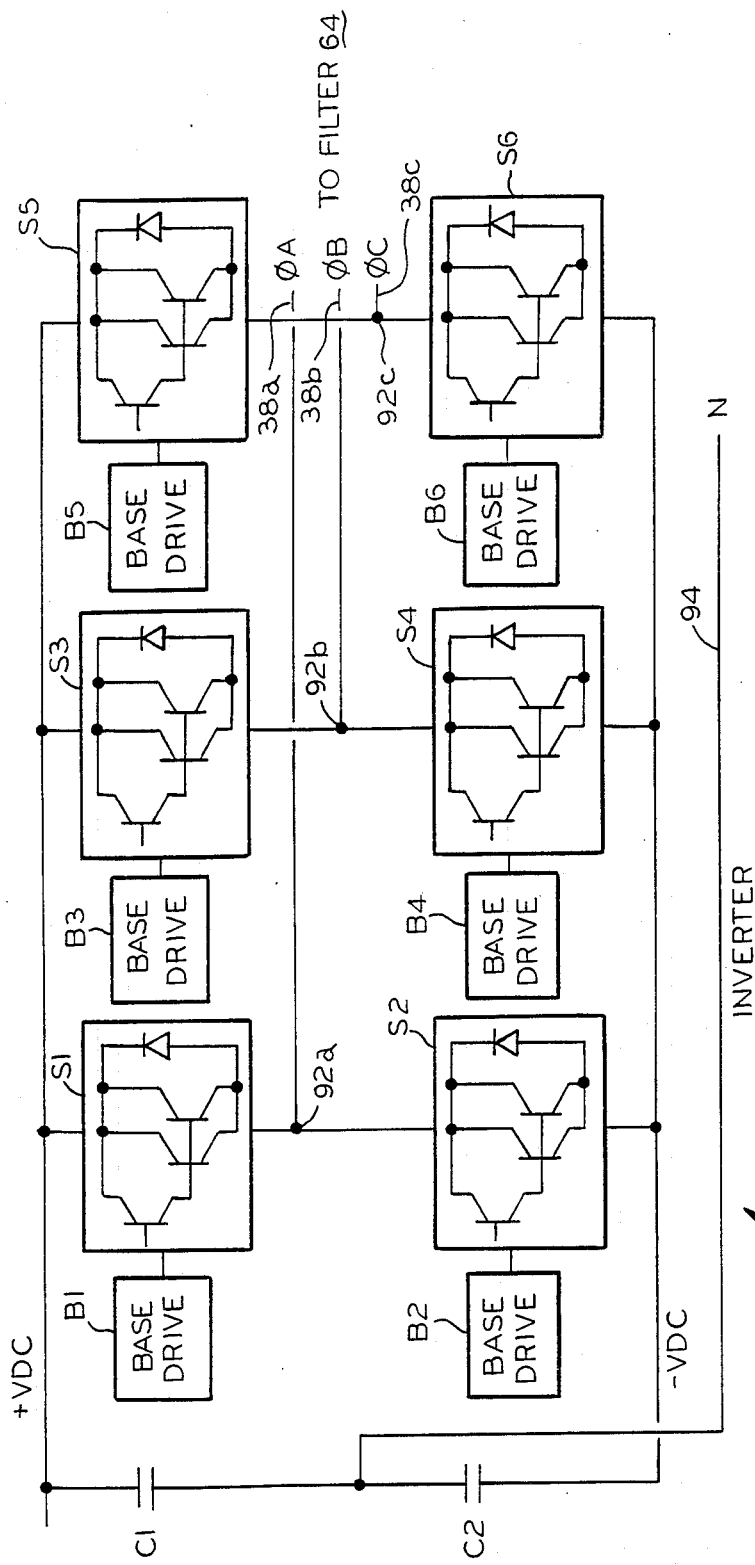
FIG. 4 is a schematic diagram illustrating the main inverter of FIG. 3.

Referring to FIG. 4, a schematic diagram illustrates one alternative circuit for the main inverter 46. Particularly, the inverter 46 is a voltage source inverter having six power switch circuits S1–S6. The six power switch circuits S1–S6 are connected in a 3-phase bridge configuration. Each of the power switch circuits S1–S6 is driven by an associated respective base drive circuit B1–B6. The base drive circuits B1–B6 are driven by the signals on the line 88 from the GCCU 22 in a conventional manner The switch circuits S1–S6 are connected between the plus voltage DC rail and the minus voltage DC rail of the DC link filter 44. The 3-phase armature windings 34 of the main generator 12 are connected by the lines 38a–38c, respectively, to junctions 92a–92c between pairs of series-connected switch circuits S1–S6. A neutral line 94 to the main generator 12 is connected at a junction between filter capacitors C1 and C2 across the DC link filter 44.

Although not shown, the excitation inverter and control 48 may include an excitation inverter of generally similar construction to the main inverter 46 illustrated in FIG. 4. Alternatively, other circuits may be utilized for either or both of the main inverter 46 and the excitation inverter, as is well known.

Although no implementation for the control of the excitation inverter and control 48 is illustrated herein, reference may be had to the Rozman et al. co-pending application incorporated by reference herein for illustrative embodiments thereof.

With reference to FIG. 5, a block diagram illustrates the implementation of the current estimator 68 of the GCCU 22, see FIG. 3, according to the invention. Specifically, the GCCU 22 includes the main inverter control unit 74 and the current estimator 68. A detailed description of the main inverter control unit 74 is not provided herein. Particularly, the main inverter control may be of any desired form which is operable to control the inverter 46 responsive to the current signal on the line 69 and the rotor position signal on the line 70 to develop the base drive commands on the line 88. An illustration of a typical such main inverter control unit 7 is provided in the Rozman et al. co-pending application incorporated by reference herein.

The motor 12 described herein is commonly referred to as a brushless DC motor inasmuch as it is powered by alternately applying positive and negative DC signals to the stator coil. However, the power applied to the motor is in the form of AC power. Therefore, the current estimator 68 according to the invention could be utilized with any control system for operating an AC motor as well as the brushless DC motor disclosed herein, as will be obvious to those skilled in the art.

The power PAC applied to a three phase AC motor, operating at a unity power factor, is determined according to the following equation (1):

$$P_{AC} = 3 \cdot V_{AC} \cdot I_{AC},$$

where:
$V_{AC}$—AC motor phase voltage; and
$I_{AC}$=AC motor phase current.

The power PAC is also determined in accordance with the following equation (2):

$$P_{AC} = P_{in} P_{loss},$$

where:
$P_{in}$-input power applied to the converter 36; and
$P_{loss}$-power due to the losses in the rectifier 42, DC link and filter 44, inverter 46, and the necessary conductors.

As discussed in the Rozman et al. co-pending application, the motor start control includes a constant torque motoring mode at speeds between zero and the base speed The base speed represents 1.0 per unit speed. In this mode, constant torque is achieved by maintaining the air gap flux constant by applying constant field current and by maintaining the armature voltage to speed ratio at a constant. Particularly, the field current is selected to provide unity power operation. The commutation angle is selected to maintain stator motor current at the desired constant level. Specifically, power is a function of both the product of torque and speed and the product of applied voltage and current. By maintaining a constant volt/hertz ratio the torque varies as a function of current. Therefore, if current is maintained constant, then torque is also constant.

Resultantly, below base speed, the inverter output voltage VAC is determined in accordance with the following equation (3):

$$V_{AC} = K_{v/hz} \omega + V_0,$$

where:

$K_{v/hz}$-a constant coefficient which determines the volts per hertz ratio; and $V_0$-the boost voltage required to offset the IR drop of the motor 12 at low speeds.

Substituting the first and second equations (1) and (2) into the third equation (3) and solving for $I_{AC}$ results in the following equation (4):

$$I_{AC} = (P_{in} - P_{loss})/3((K_{v/hz} \cdot \omega) + V_0).$$

The effect of the power losses $P_{loss}$ on the accuracy of current estimation can be resolved by storing and subtracting the power detected when the motor is in a stalled condition or rotates at a very low speed. Under these conditions the power measured represents the power losses in the start control.

With reference to FIG. 5, the input power signal on the line 76 from the power detector 78, see FIG. 3, is applied to a first memory unit 100 and as input to a first summer 102. The first memory unit 100 has an output on a line 104 which is also applied to the first summer 102. The first memory unit 100 receives a control input on a line 106 from a speed detector 108.

The rotor position signal on the line 70 is applied to a speed signal converter 110. The speed converter 110 may perform a derivative operation for converting rotor position to speed, as is well known, and develops a speed signal on a line 112.

The speed detector 108 receives the speed signal on the line 112 and develops the control signal on the line 106 to indicate if the motor is in a stalled condition or is rotating at a preselected low speed. The memory unit 100 is controlled in accordance with the control signal on the line 106 to output the level of the input power signal received on the line 76 to the first summer 102 at speeds below the preselected low speed. Once the preselected low speed is reached, the memory unit 100 stores the value of the input power signal on the line 76 and outputs the stored value at speeds greater than the preselected speed. Accordingly, the signal on the line 104 represents power losses $P_{loss}$.

The first summer 102 subtracts the power losses from the input power to develop an output signal on a line 114, representing the second equation (2), above, to a divider 116.

The motor speed signal on the line 112 is also applied to a second speed detector 118 and a second memory unit 120. The second speed detector 118 develops a control signal on a line 122 to the second memory unit 120. The second memory unit 120 operates in conjunction with the second speed detector 118 similarly to the first memory unit 100. Particularly, at speeds below the base speed, the speed signal on the line 112 is passed through the memory unit 120 to a multiplier 122. Above the base speed the second memory unit sends a constant, representing the base speed, to the multiplier 124. The multiplier 124 also receives a constant $K_1$ from a block 126 and provides the resultant product to a second summer 128 which also receives a constant $K_2$ from a block 130.

According to the illustrative embodiment of the invention the constant $K_1$ represents the constant $K_{v/hz}$ and the constant $K_2$ represents the constant $V_0$. Resultantly, the output of the second summer 128 is a signal on a line 132 formed in accordance with the third equation (3), above.

The signal on the line 132 is also applied to the divider 116, which develops the output on the line 69 proportional to the estimated AC motor current as determined in accordance with the fourth equation (4), above.

Thus, according to the present invention as described and illustrated herein above, the AC motor current is estimated by using input power feedback and motor speed, which permits the elimination of motor current sensors, resulting in a reduction of weight and size of the motor control system.

The estimated current value represents an estimation of instantaneous current. Such current measurement does not require filtering. Therefore, in accordance with the invention, by estimating the RMS value of instantaneous motor current, large delays resulting from the use of filtering devices is eliminated and dynamic motor performance is improved.

The GCCU 22 described herein can be implemented with suitable electrical or electronic circuits, or with a software programmed control unit, as is obvious to those skilled in the art.

Thus, the invention broadly comprehends a motor control employing current estimation.

We claim:

1. A current estimator for a motor having a rotor and a stator having a stator coil which is energized by a converter which receives input power from a source of power for imparting rotation to the rotor, comprising:
   first sensing means for sensing the speed of rotational movement of the rotor;
   second sensing means for sensing the power drawn by the stator coil, including a power sensor for sensing converter input power, means for determining power losses in the converter and means for subtracting power losses from input power to determine power drawn by the stator coil; and
   feedback means coupled to said first and second sensing means for developing a feedback signal representing an estimation of actual current through the stator coil responsive to said rotor speed and said power drawn by the stator coil.

2. The current estimator of claim 1 wherein said developing means includes means for determining voltage applied to the stator coil responsive to rotor speed.

3. The current estimator of claim 2 wherein said developing means estimates the current through the stator coil responsive to the power drawn by the stator coil divided by said voltage applied to the stator coil.

4. A control for a brushless electromotive machine having a rotor and a stator having a stator coil which is controllably energized by a converter which receives input power from a source of power for imparting rotation to the rotor, comprising:

first sensing means for sensing the speed of rotational movement of the rotor;

second sensing means for sensing the power drawn by the stator coil, including a power sensor for sensing converter input power, means for determining converter power losses in the converter and means for subtracting power losses from input power to determine power drawn by the stator coil;

feedback means coupled to said first and second sensing means for developing a feedback signal representing an estimation of actual current through the stator coil responsive to said speed of the rotor and said power drawn by the stator coil; and control means coupled to said developing means for controllably energizing the stator coil responsive to a current reference signal and the current estimation feedback signal to control stator current.

5. The control of claim 4 wherein said developing means includes means for determining voltage applied to the stator coil responsive to rotor speed.

6. The control of claim 5 wherein said developing means estimates the current through the stator coil responsive to the power drawn by the stator coil divided by said voltage applied to the stator coil.

7. A start control for a brushless DC machine having a rotor and a stator having a stator coil which is controllably energized by a converter which receives input power from a source of DC power defining a positive and a negative DC voltage for imparting rotation to the rotor, comprising:

first sensing means for sensing the speed of rotational movement of the rotor;

second sensing means for sensing the power drawn by the stator coil, including a power sensor for sensing converter input power, means for determining power losses in the converter and means for subtracting power losses from input power to determine power drawn by the stator coil;

switching means coupled between the source of DC power and the stator coil for alternately applying the positive and the negative voltage to the coil;

feedback means coupled to said first and second sensing means for developing a feedback signal representing an estimation of actual current through the stator coil responsive to said speed of the rotor and said power drawn by the stator coil; and control means coupled to said developing means for controllably operating said switching means responsive to a current reference signal and the current estimation feedback signal to control stator current.

8. The control of claim 7 wherein said developing means includes means for determining voltage applied to the stator coil responsive to rotor speed.

9. The control of claim 8 wherein said developing means estimates the current through the stator coil responsive to the power drawn by the stator coil divided by said voltage applied to the stator coil.

10. The control of claim 7 wherein said developing means includes means for virtually instantaneously determining the estimation of current at all rotational speeds.

* * * * *